Oct. 28, 1952 W. J. S. LEE 2,615,724
COLLAPSIBLE SLED
Filed June 27, 1949 2 SHEETS—SHEET 2
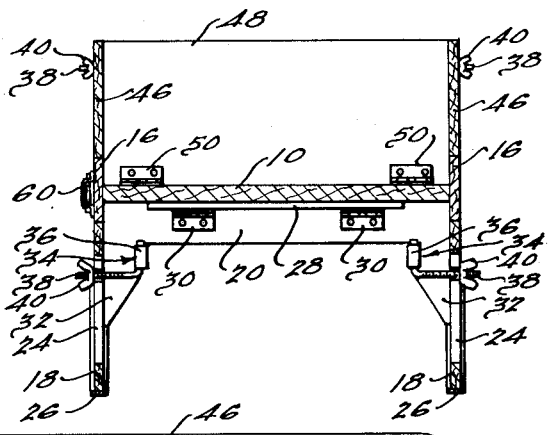
FIG. 3.
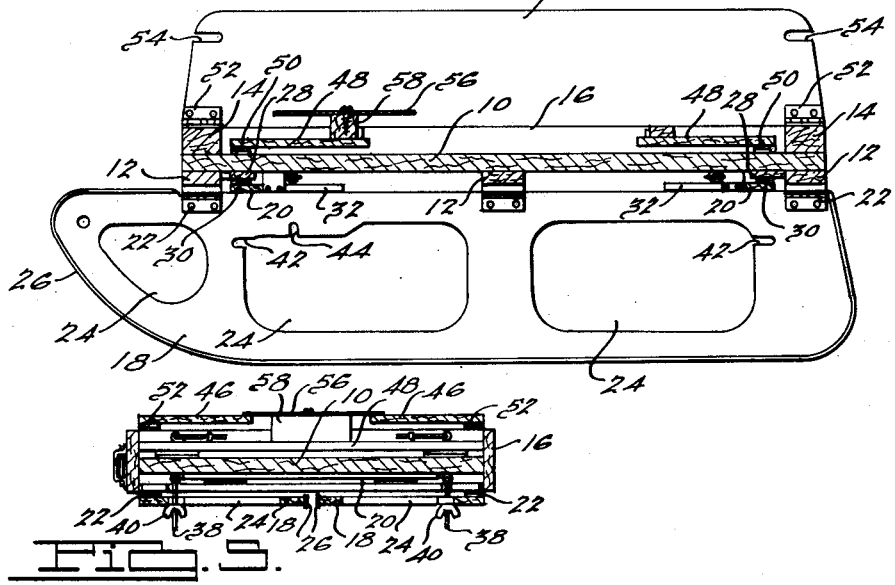
FIG. 4.
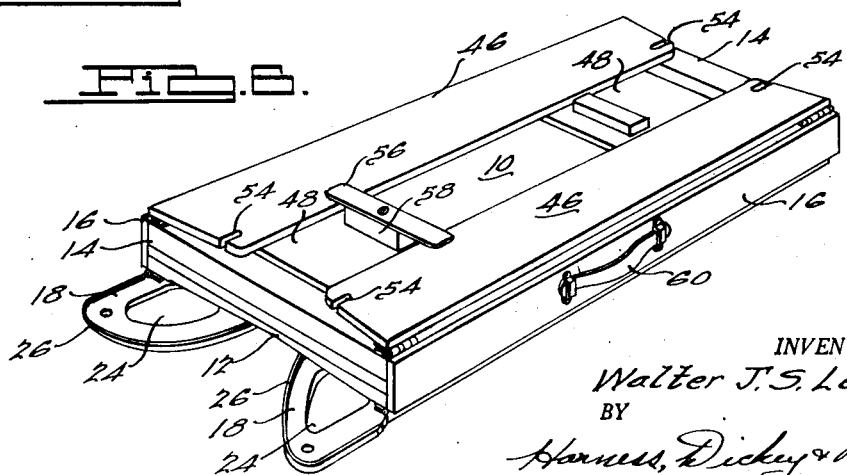
FIG. 5.
FIG. 6.
INVENTOR.
Walter J. S. Lee.
BY
Harness, Dickey & Pierce.
ATTORNEYS.

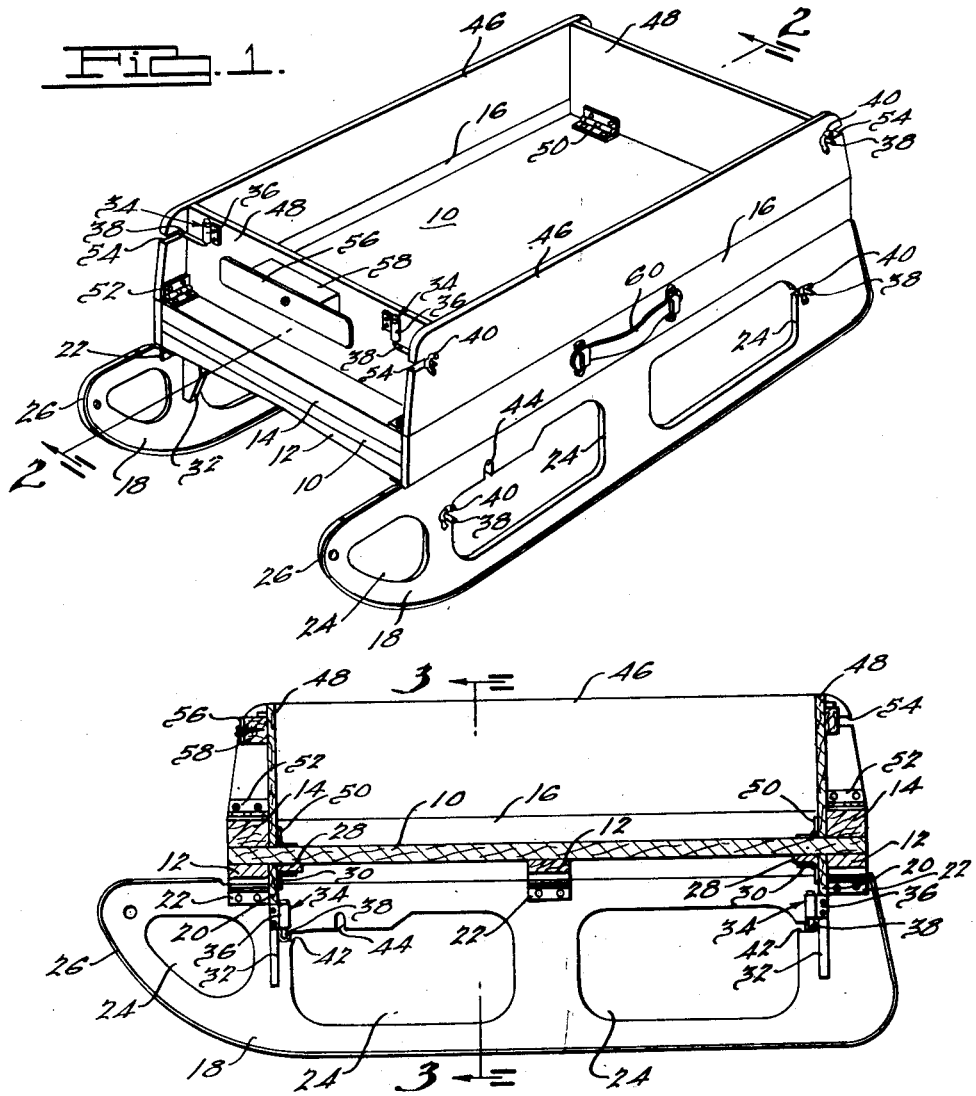

Patented Oct. 28, 1952

2,615,724

UNITED STATES PATENT OFFICE 2,615,724

COLLAPSIBLE SLED

Walter J. S. Lee, Rochester, Mich.

Application June 27, 1949, Serial No. 101,641

4 Claims. (Cl. 280—20)

This invention relates to new and useful improvements in collapsible carriers and more particularly to a collapsible sled of the type used by ice fishermen to haul their equipment from the shore to the fishing site.

For winter fishing, a sled is the most convenient means of transporting fishing equipment and the like across the ice from the shore to the fishing site. The ordinary sled, however, does not fit conveniently in the trunk compartment of an automobile, nor will it fit conveniently in the passenger compartment of the vehicle. Moreover, it is difficult to fasten equipment on a conventional sled in such manner that the smaller articles cannot fall off enroute. From the foregoing it will be readily apparent that there is a definite need in the art for a small sled that can be collapsed to form a compact package which will fit conveniently in the trunk or passenger compartment of an automobile and will, when expanded or erected, accommodate and safely transport fishing equipment.

On fishing trips of relatively long duration it is customary to erect a shelter or shanty at the fishing site. These shelters usually take the form of a tent which can be folded into a compact bundle when not in use. It is contemplated that the sled embodying the present invention, if made in a relatively large size, may also serve as a floor for the shelter.

An important object of the present invention is to provide a collapsible sled that can be made in a variety of sizes according to the particular use for which it is intended.

Another object of the invention is to provide a collapsible sled that can be folded into a compact package to facilitate carrying and transportation.

Still another object of the invention is to provide a collapsible sled having unique interlocking means for holding the parts of the sled rigidly in either collapsed or extended position.

Yet another object of the invention is to provide a collapsible sled that can be easily and quickly erected or collapsed.

A further object of the invention is to provide a collapsible sled which comprises a unitary assembly so that there are no parts which might become lost or misplaced.

Other objects and advantages of the invention will be apparent during the course of the following description.

In the drawing forming a part of this specification and wherein like numerals are employed to designate like parts throughout the same:

Fig. 1 is a perspective view of a collapsible sled embodying the invention, showing all the parts in extended position;

Fig. 2 is a longitudinal, vertical, sectional view taken on the line 2—2 of Fig. 1;

Fig. 3 is a transverse, vertical, sectional view taken on the line 3—3 of Fig. 2;

Fig. 4 is a view similar to that of Fig. 2 but showing parts of the sled in folded or collapsed position;

Fig. 5 is a transverse, vertical, sectional view showing all the parts in folded position; and Fig. 6 is a perspective view showing the sled fully collapsed.

In the drawing, wherein, for the purpose of illustration, is shown a preferred embodiment of the invention, the numeral 10 designates a bottom of generally rectangular form having transverse reinforcing ribs 12 attached to the undersurface thereof. Transverse strips 14 also are attached to the top surface of the bottom 10 and these strips are located at the ends of the bottom as perhaps best shown in Fig. 2. At opposite sides of the bottom 10 are strips 16 which are conterminous with the bottom and extend flush with the transverse strips 12 and 14.

The bottom assembly hereinabove described provides a strong, rigid structure capable of withstanding loading, handling, and abuse to which a device of this character normally is subjected in use and, in addition, provides means for mounting the various hinged panels which, together with the bottom assembly, make up the complete sled structure. In the completed structure the transverse members 12 and 14 not only reinforce the bottom 10 but they also form back-up blocks which strengthen and reinforce various of the hinged panels.

The substructure of the sled comprises a pair of runner panels 18 at opposite sides of the bottom assembly and a pair of end panels 20 mounted at opposite ends of the bottom assembly and between the runner panels. As perhaps best shown in Fig. 3, the upper edges of runner panels 18 abut the bottom edges of side strips 16, and the panels are fastened to the bottom assembly by hinges 22. One leaf of each hinge 22 is fastened to the inner surface of its runner panel 18 and the other leaf thereof is fastened to one of the transverse braces 12. Both runner panels 18 are provided at spaced points along the length thereof with openings 24, and metal strips 26 are fastened to the outer edges of the runner panels to strengthen the same and to provide a surface that will slide easily across the snow.

End panels 20 are fastened to mounting strips 28 which extend transversely across the bottom 10 inside and adjacent to the endmost strips 12. As perhaps best shown in Fig. 2, the panels 20 seat edgewise against the mounting strips 28 and are fastened thereto by hinges 30. One leaf of each hinge 30 is fastened to the inner side of its respective end panel 20 and the other leaf thereof is fastened to the undersurface of a respective mounting strip 28. At opposite ends of the transverse panels 20 are depending arms 32 which extend a substantial distance across the runners 18 to strengthen and reinforce the same.

In practice, the various panels which form the substructure of the sled may be extended as shown in Fig. 2 or folded as shown in Figs. 5 and 6. When extended, all of the panels 18 and 20 extend downwardly at right angles to the bottom 10 and the ends of transverse panels 20 abut against the runner panels 18 to prevent the latter from folding inwardly to the collapsed position. In this connection it will be observed that abutting engagement between the runner panels 18 and the side strips 16 prevent the runners from swinging outwardly beyond the position shown. Also, abutting edgewise engagement between the end panels 20 and the mounting strips 28, as well as engagement of the panels with transverse strips 12, prevents the panels 28 from swinging outwardly beyond the position shown. It will be readily apparent, however, that the two end panels 20 can be folded inwardly to lie parallel with the bottom 10; and when the end panels are so folded, the side runner panels 18 can be folded inwardly on top of the end panels.

In order to hold the panels 18 and 20 rigidly in either extended or folded position, I provide each of the depending arms 32 with latch means designated generally by the numeral 34. The latch means here shown comprises a hinge section 36 and a generally L-shaped screw member 38. One leg of the screw member 38 is swiveled in the barrel portion of hinge section 36, and the other leg thereof carries a wing nut 40. The hinge members 36 are mounted on the inner edges of arms 32 as shown in Fig. 2, and the screw members 38 are swingable outwardly through openings 24 in the runners 18. In this connection it will be observed that the openings 24 which receive screw members 38 are formed with notches 42. When the screw members 38 are swung outwardly, they enter notches 42 and project beyond the outer sides of runners 18. Wing nuts 40 are disposed on the projecting portions of screw members 38. Thus the wing nuts 40 can be tightened to pull the runners 18 solidly against the abutting ends of transverse panels 20 and to hold all the panels solidly assembled in interlocking engagement.

On the other hand, when panels 18 and 20 occupy folded positions, the screw members 38 carried by the forward panel 20 swing outwardly into notches 44 which are provided in the upper longitudinal edges of the corresponding openings 24. Thus, the latch means 34 interlock with the runner panels 18 when all the panels are folded, as well as when all the panels are extended, and, when so interlocked, the latch means hold the panels solidly in collapsed or folded position.

The superstructure of the sled comprises a pair of side panels 46 and a pair of end panels 48. The end panels 48 are fastened to the bottom 10 by hinges 50 and the side panels 46 are fastened to the transverse strips 14 by hinges 52. In this connection it will be observed that the end panels 48 seat downwardly against the top 10 so as to be movable between the folded position shown in Fig. 4 and the extended position shown in Fig. 1. In the folded position panels 48 lie entirely between side strips 16, and in the extended position they are disposed between and in endwise abutting engagement with the side panels 46. Similarly, the side panels 46 can be moved between the folded and extended positions shown in Figs. 5 and 1 respectively. Outward swinging movement of the side panels 46 beyond the position shown is prevented by abutting engagement thereof with the strip 16, and outward swinging movement of end panels 48 beyond the position shown is prevented by abutting engagement thereof with the bottom 10 and also with the end strips 14 (Fig. 2).

In order to hold the panels 46 and 48 solidly in extended positions, I provide latch means 34 at opposite ends of each panel 48. As suggested, the latches are mounted on the outer surfaces of panels 48 adjacent the ends thereof, and screw members 38 are swingable outwardly through notches 54 in the ends of panels 46. Wing nuts 40 carried by screw members 38 can be similarly tightened against the side panels 46 to hold the parts solidly fastened together in interlocking relationship.

In order to hold panels 46 and 48 in folded position, I provide a pivoted bar 56 on the forward end panel 48. In this connection it will be observed that the pivoted bar 56 is disposed at substantially the middle of panel 48 and is supported on a mounting block 58. When the end panels 48 are folded inwardly to the position shown in Fig. 4 and the pivoted bar 56 is positioned to extend longitudinally of the sled, the side panels 46 can be swung inwardly on top of the end panels. The bar 56 can then be swung substantially ninety degrees so that the terminal portions thereof overlap the side panels as shown in Fig. 6 to hold the parts securely in folded position.

For convenience in handling and carrying the sled I provide a handle 60 on one of the side strips 16. I prefer to use a flat, suitcase-type handle, as it is convenient in use and unobstructive when the sled is erected as shown in Fig. 1.

It will thus be apparent that I have achieved the objects of my invention. I have provided a light-weight sled that can be folded into a compact package for transportation in a vehicle or the like. When it is desired to use the sled, the folded sections or panels can be unfolded and securely locked in extended position. The substructure panel assembly provides runners that will support a relatively great weight and the superstructure panel assembly provides a closed bed or box for the sled that will readily hold all the usual fishing paraphernalia. No parts of the assembly are removable and consequently there are no parts that can be easily misplaced or lost in any position of the parts.

Having thus described the invention, I claim:

1. A collapsible sled comprising a bottom; runners pivotally connected to the bottom at opposite sides thereof, said runners normally depending from and disposed substantially at right angles to said bottom and foldable inwardly substantially parallel to the undersurface of said bottom; panels pivotally connected to the bottom at opposite ends thereof and between said runners, said panels normally depending from and disposed substantially at right angles to said bottom with the ends thereof abutting and reinforcing said runners and foldable inwardly flat against said bottom so as to lie under said runners when the latter occupy folded positions; and pivoted latch elements carried by said panels, all of said latch elements being swingable through openings in the runners and engageable in notches provided in the edges of such openings when the panels and the runners occupy extended positions whereby to hold the parts solidly in extended position and at least certain of said latch elements being also engageable in notches provided in the edges of said openings when both the panels and the runners occupy folded positions whereby to hold the parts solidly fastened together in folded position.

2. A collapsible sled comprising a bottom; pivoted panels at opposite ends of said bottom movable between extended and folded positions; pivoted runners at opposite sides of the bottom also movable between extended and folded positions, the ends of said panels abutting the inner sides of the runners when both the panels and the runners are extended whereby to reinforce the runners and to hold the latter in extended positions, said panels and said runners being disposed in overlapping relation when both are folded; catch means carried by said runners; and pivoted latches carried by and movable with said panels in juxtaposition to said catch means, said latches being swingable about their pivots to lie flat against the undersurface of said bottom and at least certain of said latches also swingable about said pivots into interlocking engagement with said catch means when the runners occupy either folded or extended positions.

3. A collapsible sled comprising a bottom; runners pivotally connected to the bottom at opposite sides thereof and provided with openings therein having notches in the sides and ends thereof, said runners normally depending from and disposed substantially at right angles to said bottom and foldable inwardly substantially parallel to the undersurface of said bottom; panels pivotally connected to the bottom at opposite ends thereof and between said runners, said panels normally depending from and disposed substantially at right angles to said bottom when the ends thereof are abutting and reinforcing said runners and foldable inwardly flat against said bottom so as to lie under said runners when the latter occupy folded positions; and pivoted latches carried by and movable with said panel, said latches swingable through the openings in the runners and into interlocking engagement with notches in the ends of such openings when the runners and panels occupy extended positions and said latches swingable through the openings in said runners and into interlocking engagement with notches in the sides of such openings when the panels and runners occupy folded positions.

4. In a collapsible sled, a bottom; runners pivotally connected to the bottom at opposite sides thereof, said runners normally disposed substantially at right angles to said bottom and foldable inwardly substantially parallel to the undersurface to said bottom, said runners also having openings therein and notches in the edges of the openings, end panels pivotally connected to the bottom at opposite ends thereof and between said runners, said end panels normally disposed substantially at right angles to said bottom with the ends thereof abutting and reinforcing said runners and foldable inwardly flat against said bottom so as to lie under said runners when folded prior to the folding of said runners and when the latter occupy folded positions; and pivoted latches carried by said end panels in juxtaposition to said notches, said latches movable about their pivots independently of said end panels through the openings in said runners and into interlocking engagement with said notches when said runners occupy either extended or folded positions to hold said panels and said runners solidly fastened together in such position.

WALTER J. S. LEE.

REFERENCES CITED

The following references are of record in the file of this patent:

UNITED STATES PATENTS

| Number | Name | Date |
|---|---|---|
| 336,411 | Hewitt | Feb. 16, 1886 |
| 376,585 | Crandall | Jan. 17, 1888 |
| 1,773,190 | Link | Aug. 19, 1930 |

FOREIGN PATENTS

| Number | Country | Date |
|---|---|---|
| 63,950 | Denmark | Sept. 3, 1945 |